(12) United States Patent
Chow

(10) Patent No.: US 9,951,491 B2
(45) Date of Patent: Apr. 24, 2018

(54) BRICKS AND A METHOD FOR USING SUCH BRICKS TO BUILD DIKES IN WATER

(71) Applicant: Tsun Chow, Hong Kong (HK)

(72) Inventor: Tsun Chow, Hong Kong (HK)

( * ) Notice: Subject to any disclaimer, the term of this patent is extended or adjusted under 35 U.S.C. 154(b) by 0 days.

(21) Appl. No.: 15/364,247

(22) Filed: Nov. 29, 2016

(65) Prior Publication Data

US 2017/0335533 A1 Nov. 23, 2017

Related U.S. Application Data

(62) Division of application No. 15/194,557, filed on Jun. 27, 2016.

(30) Foreign Application Priority Data

May 18, 2016 (CN) .......................... 2016 1 0331498

(51) Int. Cl.
*E02B 3/10* (2006.01)
*E04C 1/39* (2006.01)
*B63B 35/30* (2006.01)
*B63B 35/44* (2006.01)

(52) U.S. Cl.
CPC .............. *E02B 3/10* (2013.01); *B63B 35/306* (2013.01); *B63B 35/4413* (2013.01); *E04C 1/39* (2013.01)

(58) Field of Classification Search
USPC ........................................... 405/233
See application file for complete search history.

(56) References Cited

U.S. PATENT DOCUMENTS

| 1,952,380 A * | 3/1934 | Leemann | E02B 3/066 405/227 |
| 5,911,539 A * | 6/1999 | Egan | E02B 3/122 405/16 |
| 2008/0190055 A1* | 8/2008 | Schmid | E04B 1/6807 52/259 |

* cited by examiner

*Primary Examiner* — Kyle Armstrong

(57) ABSTRACT

The present invention discloses a brick, comprising a brick body, which comprises at least one slot position for connecting a column, and a method for using the bricks to build dikes in water, including the following steps: (1) drilling a plurality of pile holes at water bottom; (2) casting concrete into each of the pile holes to form concrete columns; (3) stacking up a number of the bricks along the concrete columns and having them tightly connected to form a wall; (4) filling the clearances between the concrete columns and the bricks with mortar. The bricks and dike building method provided by the present invention are suitable for direct over-water dike building, the construction is fast and the dikes built are firm and stable, have superior waterproof function and can effectively prevent the impact of currents, winds and waves.

7 Claims, 17 Drawing Sheets

BRICKS AND A METHOD FOR USING SUCH BRICKS TO BUILD DIKES IN WATER

CROSS-REFERENCE TO RELATED APPLICATIONS

The present invention is a Divisional Application of U.S. application Ser. No. 15/194,557, filed on Jun. 27, 2016, which claims the benefit of Chinese Patent Application No. 201610331498.9 filed on May 18, 2016, the contents of which are hereby incorporated by reference.

TECHNICAL FIELD

The present invention relates to construction engineering, particularly to bricks and a method for using such bricks to build dikes.

DESCRIPTION OF THE BACKGROUND

Particularly, the coastal areas have made remarkable achievements in economy. However, economic development prompts people to "borrow" land resources from seas and rivers to meet their production and operation demands. The projects of reclamation, wharves and piers of cross-river (sea) bridges all need to build dikes in water (rivers or seas). Whereas, the existing construction methods are time consuming and inefficient and unable to realize direct over-water construction and meet actual requirements.

SUMMARY OF THE INVENTION

To address the foregoing defects of prior art, the present invention provides a kind of bricks that are adaptable to different special conditions of riverbed and seabed and provides a dike building method. Using the present invention, dikes can be quickly and efficiently built in water.

To solve the foregoing technical problem, the present invention adopts the following technical solution: a brick, comprising a brick body which comprises at least one slot position for connecting a column. This solution enables bricks to match columns and form a wall.

Further, the quantity of the slot positions is two and they are at the two ends of the brick body respectively. The slot positions are extended vertically.

Still further, a hollow column and/or a hollow wall penetrating the upper and lower surfaces of the brick body is disposed in the middle of the brick body. Preferably, the upper edge of the side wall of the hollow wall is lower than the upper edge of the brick body, and/or the lower edge of the side wall of the hollow wall is higher than the lower edge of the brick body.

Further, tongue-and-groove positions of matching shapes are disposed on the upper end face and lower end face of the brick body and are used to make two adjacent brick bodies interference-fit with each other. Preferably, a waterproof adhesive layer is disposed on top surface of the brick body and matches the top surface of the waterproof adhesive layer in shape. All external angles of the brick body are made into fillets.

Further, the brick is a bottom brick and the thickness of the lower part of the brick body of the bottom brick decreases gradually from up to down; or a number of pit slots are disposed on bottom surface of the brick body of the bottom brick and contain adhesive rubber blocks. Preferably, tongue-and-groove positions for interference-fitting with other bricks are disposed on top surface of the brick body of the bottom brick.

The present invention further relates to a method for using the aforesaid bricks to build dikes in water, including the following steps: (1) drilling a plurality of pile holes at water bottom; (2) casting concrete into each of the pile holes to form concrete columns; (3) stacking up a number of the bricks along the concrete columns and having them tightly connected to form a wall; (4) filling the clearances between the concrete columns and the bricks with a waterproof material; the brick comprises a brick body, and at least one slot position connecting concrete columns is disposed in the brick body; the brick slides down and is occluded along the concrete columns through the slot position.

Further, the quantity of the slot positions of the brick body is two and they are at the two ends of the brick body respectively. The slot positions are extended vertically. In the step (3), the brick slides down along the position between two adjacent concrete columns.

A further technical solution is that a hollow column and/or a hollow wall penetrating the upper and lower surfaces of the brick body is disposed in the middle of the brick body; the method further includes step (3-1), and after the bricks are stacked up to form a wall, concrete is cast along hollow walls and/or hollow columns of the bricks to form a waterproof wall. Preferably, the upper edge of the side wall of the hollow wall is lower than the upper edge of the brick body, and/or the lower edge of the side wall of the hollow wall is higher than the lower edge of the brick body.

A further technical solution is that the step (3) further includes a step of laying bottom bricks at first and the thickness of the lower part of the brick body of the bottom brick decreases gradually from up to down; or the step (3) further includes a step of building a horizontal concrete platform at water bottom at first as well as a step of laying bottom bricks on the concrete platform at first, a number of pit slots are disposed on bottom surface of the brick body of the bottom brick and contain adhesive rubber blocks, and the bottom bricks are bonded with the concrete platform through the adhesive rubber blocks.

A further technical solution is that the step (1) is implemented through a drilling ship, the drilling ship comprises a ship body, a drilling rig device is disposed on the ship body and comprises a drilling rig body, a drill stem and a drill bushing. The ship body further comprises a release structure for release of finished columns from the ship body, and the position of the release structure corresponds to the position of the drilling rig device. In the step (2), the drill stem of the engineering drilling ship is drawn out from the drill bushing, and concrete is cast into pile holes via the drill bushing;

Preferably, the release structure is a chasm on a side of the ship body. The drilling rig device is disposed on a side of the ship body.

Preferably, a concrete production unit is further disposed on the ship body and on the side of the ship body opposite to the drilling rig device and it produces concrete in the step (2).

Preferably, the quantity of the drilling rig devices is more than two and they are distributed in an equal space. The chasms and drilling rig devices match each other in quantity and are opposite in position. In the step (1), a number of pile holes are drilled in the same time.

Preferably, the ship body further comprises a number of vertical hydraulic units and/or a number of oblique hydraulic units, each of the vertical hydraulic units comprises a first hydraulic machine and a vertical hydraulic column, the vertical hydraulic column is perpendicular to the deck of the ship body, and the first hydraulic machine is used to drive the vertical hydraulic column; each of the oblique hydraulic units comprises a second hydraulic machine and an oblique hydraulic column, the oblique hydraulic column forms a non-vertical included angle with the deck of the ship body, and the second hydraulic machine is used to drive the oblique hydraulic column; more preferably, the ship body comprises a number of sealing column sleeves, for passing of drill stems or hydraulic columns; more preferably, the quantity of the vertical hydraulic units is at least four, and they are disposed at the four end angles of the ship body; the quantity of the oblique hydraulic units is at least two;

Preferably, the ship body further comprises support frames, consistent with drilling rig devices in quantity; each of the drilling rig devices is mounted onto the ship body through a support frame; the extension direction of the support frames is perpendicular to the deck of the ship body; more preferably, the support frames further comprise tightening structures for tightening drill bushings. The tightening structures are tightening screws.

Preferably, airtight compartments are disposed at the bottom and top of the ship body; more preferably, there are a plurality of airtight compartments, which are mutually isolated.

The bricks and dike building method provided by the present invention are suitable for direct over-water dike building. The construction is fast and the dikes built are firm and stable, and have superior waterproof function and can effectively prevent the impact of currents, winds and waves.

DETAILED DESCRIPTION OF PREFERRED EMBODIMENTS

Below the present invention will be further described in details by referring to the accompanying drawings and embodiments.

Figure 1:
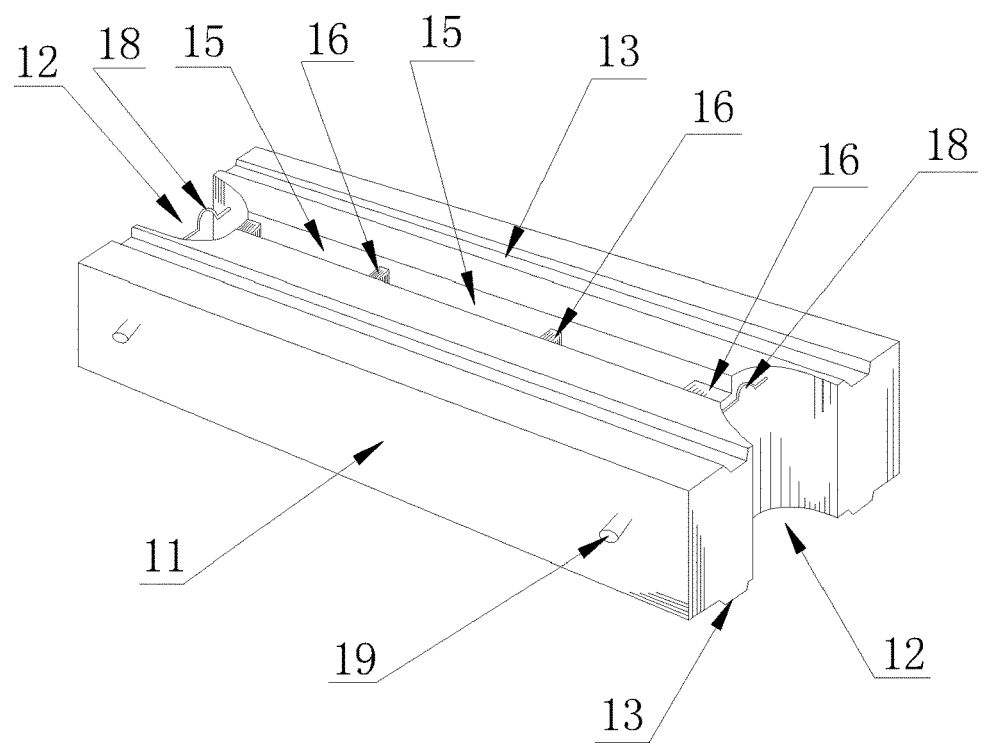
FIG. 1 is a structural schematic of the first embodiment of the present invention.

As shown in FIG. 1, the brick provided by the present invention comprises a brick body 11. A slot position 12 extended vertically is disposed at each of the two ends of the brick body 11 and matches a concrete column 1, and each brick is occluded between two concrete columns 1 through the slot positions 12 at its two ends. This approach makes the stacking of bricks more flexible and more adjustable. It helps maintain the horizontally of bricks and can more easily assure water resistance of the wall. Subject to the actual condition, the slot position 12 may be arranged in the middle of the brick body 11 to directly fix the brick body 11 onto a concrete column 1 in a sleeved manner. The brick is preferably a concrete brick and may also be a brick made of other materials as long as it can assure water resistance.

Figure 2:
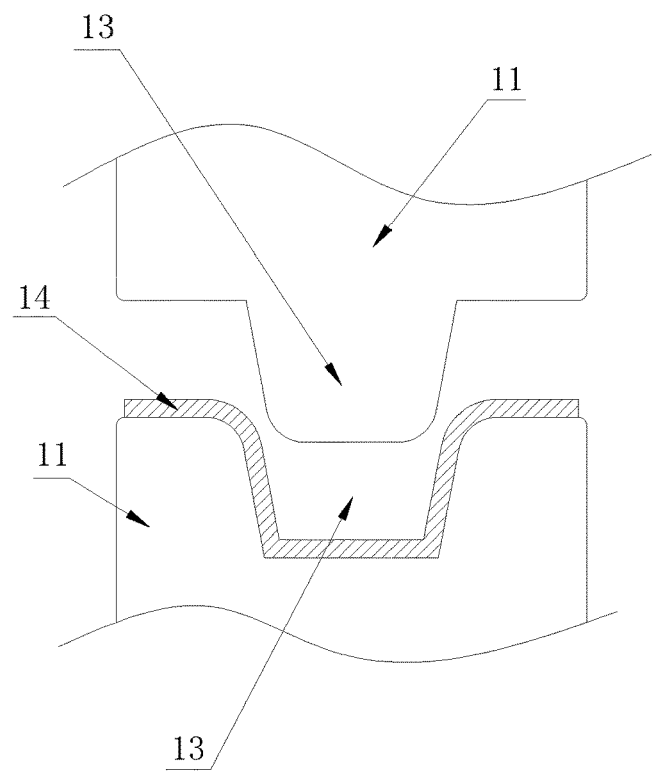
FIG. 2 is a schematic of a joggle structure of bricks provided by the present invention in a disengaged state.
Figure 3:
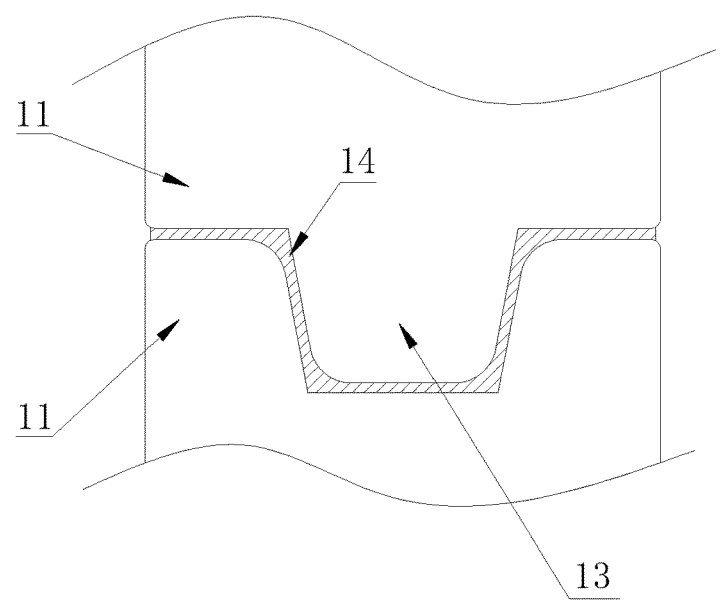
FIG. 3 is a schematic of a joggle structure of bricks provided by the present invention in an engaged state.

Tongue-and-groove positions 13 of matching shapes are disposed on the upper end face and lower end face of the brick body 11 and used to make two adjacent brick bodies 11 interference-fit with each other. In this embodiment, the tongue-and-groove positions 13 on the upper end face are two grooves, and the tongue-and-groove positions 13 on the lower end face are two tongues. After an upper brick and a lower brick are stacked up, the grooves are interference-fit with the tongues so that the bricks firmly and tightly form a wall. Subject to the actual condition, the structure of tongueand-groove positions 13 may be modified. For example, there are tongues on the upper end face and grooves on the lower end face or the upper end face and lower end face both have respective tongues and grooves as long as they can assure interference-fit. Further, as shown in FIG. 2 and FIG. 3, the top surface of the brick body 11 further comprises a waterproof adhesive layer 14, matching the top surface of the brick body in shape. The waterproof adhesive layer 14 is compacted between bricks, fills the clearances between bricks, bonds bricks and meanwhile prevents permeation of seawater or river water from the clearances between bricks. Still further, all the external angles of the brick body 11 are made into fillets to avoid collision of bricks during construction and avoid falling brick bats being stuck between bricks and forming large gaps. When bricks are compressed tightly, the waterproof adhesive layer 14 is squeezed to the clearances between fillets and upper brick and fills up the clearances to make the connection between bricks tighter.

Figure 4:
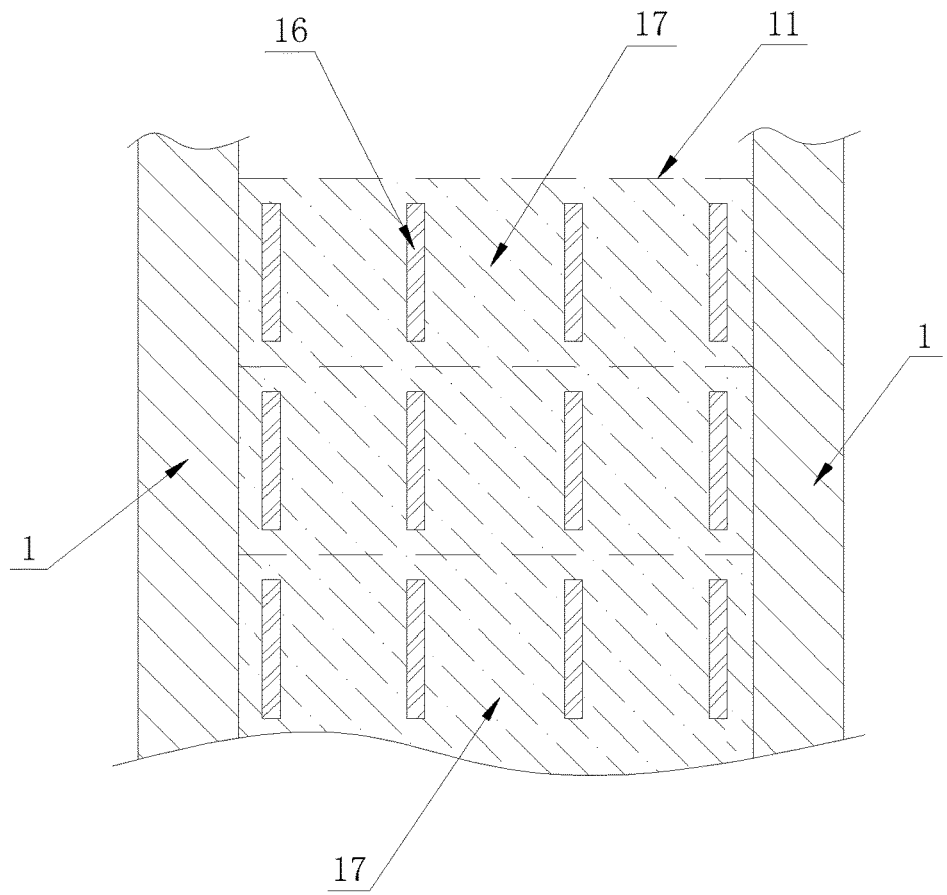
FIG. 4 is a structural schematic of a waterproof wall after the bricks provided by the present invention are stacked up into a wall.

A hollow wall 15 penetrating the upper and lower surfaces of the brick body 11 is disposed in the middle of the brick body 11. The upper edge of the side wall 16 of the hollow wall 15 is lower than the upper edge of the brick body 11, and the lower edge of the side wall 16 of the hollow wall 15 is higher than the lower edge of the brick body 11 to realize communication between hollow walls 15, and communication between the hollow wall 15 and the slot position 12. When bricks are tightly connected to form a wall, the hollow walls 15 of bricks and the clearance positions between slot positions 12 and concrete columns 1 will be connected to from an integral hollow wall space. Casting concrete along the hollow walls 15 may form a new waterproof wall 17 inside the wall. FIG. 4 shows a cross-section schematic after bricks form a wall. In the figure, the dashed contour line refers to the edge contour line of the brick body 11. As the side wall 16 of the wall misaligns with the upper and lower edges of the brick body 11, the waterproof wall 17 is connected to form an integral body. The clearances between bricks and concrete columns 1 together with the cast concrete form a part of the waterproof wall 17. Even if large gaps are formed between bricks for reason of manufacturing process, concrete will enter the gaps or the edges of the gaps during concrete casting of the hollow walls 15 and after the concrete is solidified, it can effectively stop seawater or river water from permeating along the clearances.

Subject to the actual condition, if the clearance between concrete columns 1 is small, or the clearance has narrow locations, other waterproof materials may be filled, mortar for example. As concrete contains cement and macadam, if the clearance is too narrow, macadam in concrete will be stopped outside the clearance, making concrete unable to fill up the clearance. In order to assure a waterproof effect, other waterproof materials may be cast in narrow clearance locations.

Brick ears 18 are further disposed at the two ends of the brick body 11 and intended to put the brick into water through lifting hooks. Further, an adjusting hole 19 is disposed on a side of an end face of the brick body 11. As the density is not the same inside the brick, the brick may not maintain a balance when it is lifted. In this case, a small steel barrel may be inserted into the adjusting hole 19 of the brick body 11 to easily adjust the brick to a horizontal position.

Embodiment 2

Figure 5:
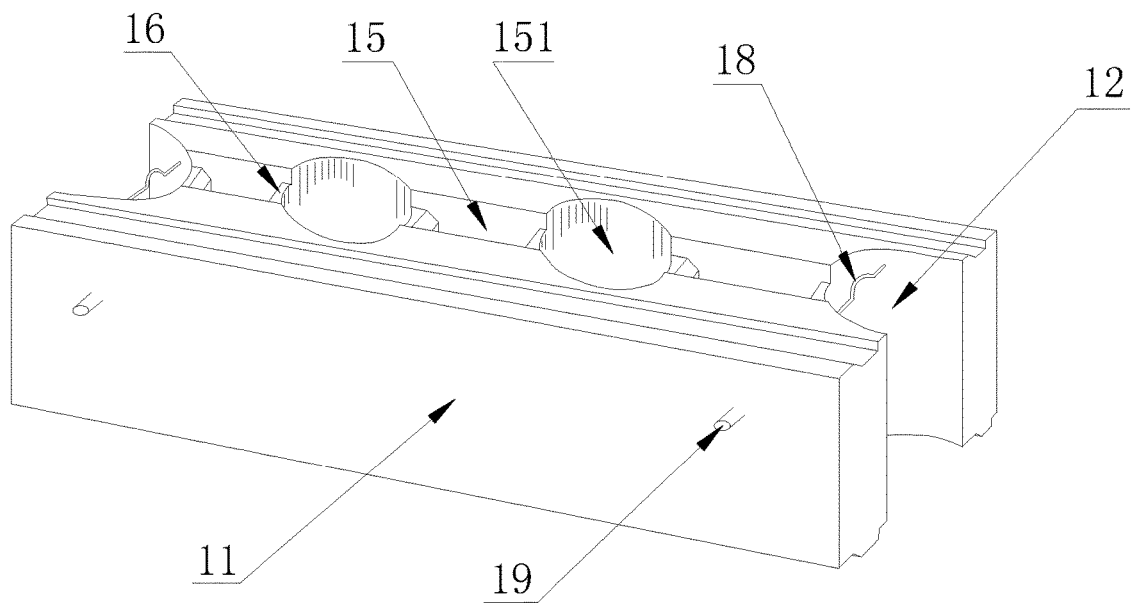
FIG. 5 is a structural schematic of the second embodiment of the present invention.
Figure 6:
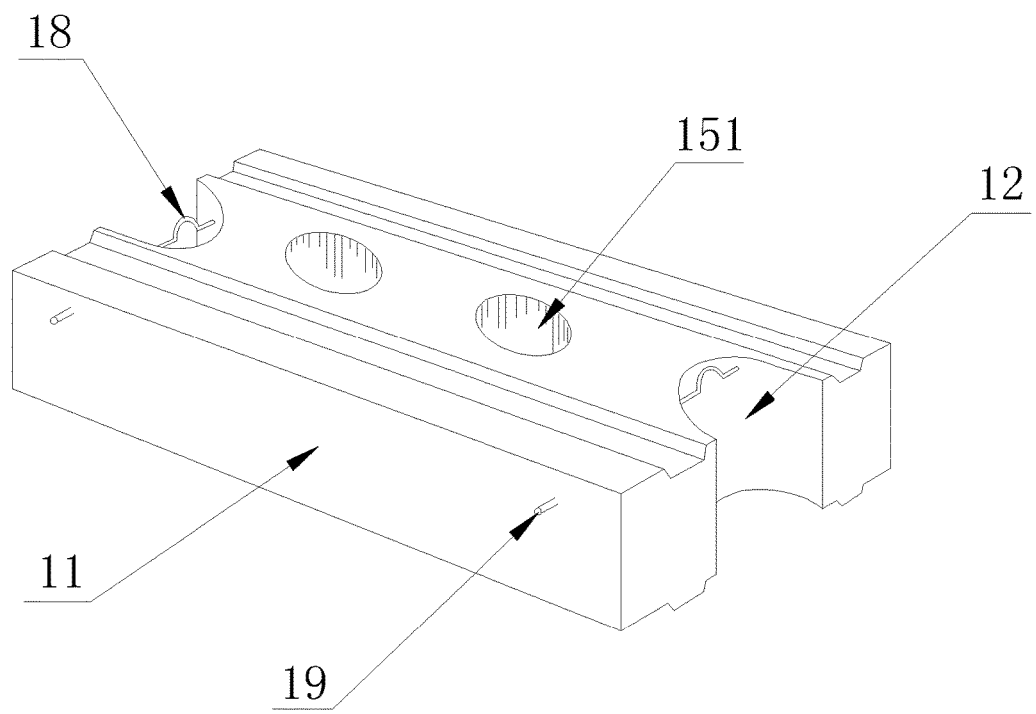
FIG. 6 is a structural schematic of an alternative embodiment of the present invention.

FIG. 5 shows an alternative embodiment of a brick provided by the present invention. Different from the foregoing first embodiment, the brick body 11 is also provided with hollow columns 151 in addition to hollow walls 15. The effect of the hollow columns 151 is to fasten bricks to make the wall more stable and further enhance the support force of the wall in addition to forming a waterproof structure. Subject to actual need, hollow columns 151 may be disposed alone without hollow walls 15 (as shown in FIG. 6). The hollow walls 15 and the hollow columns 151 may be in a round, oval or rectangular shape.

Embodiment 3

Figure 7:
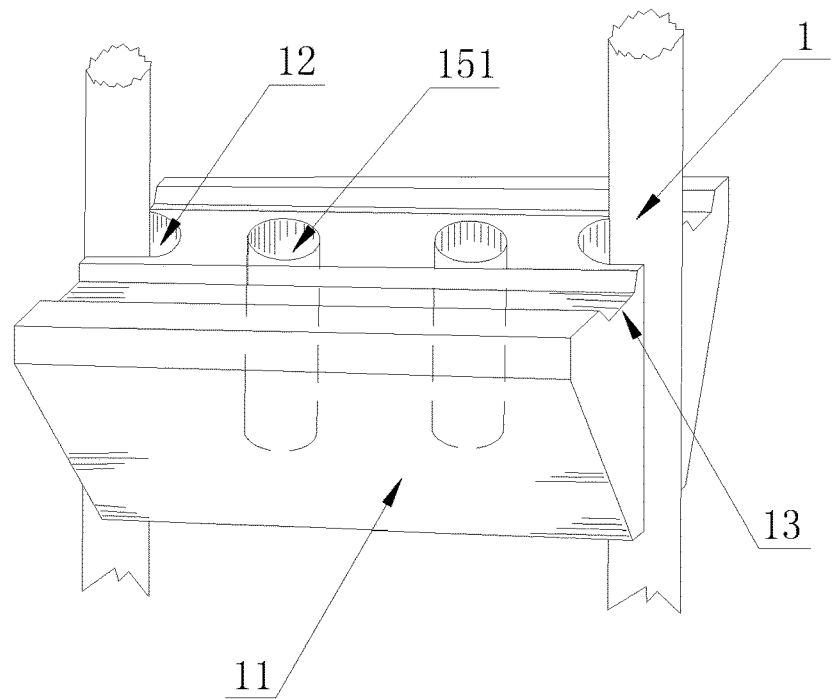
FIG. 7 is a structural schematic of the third embodiment of the present invention.
Figure 8:
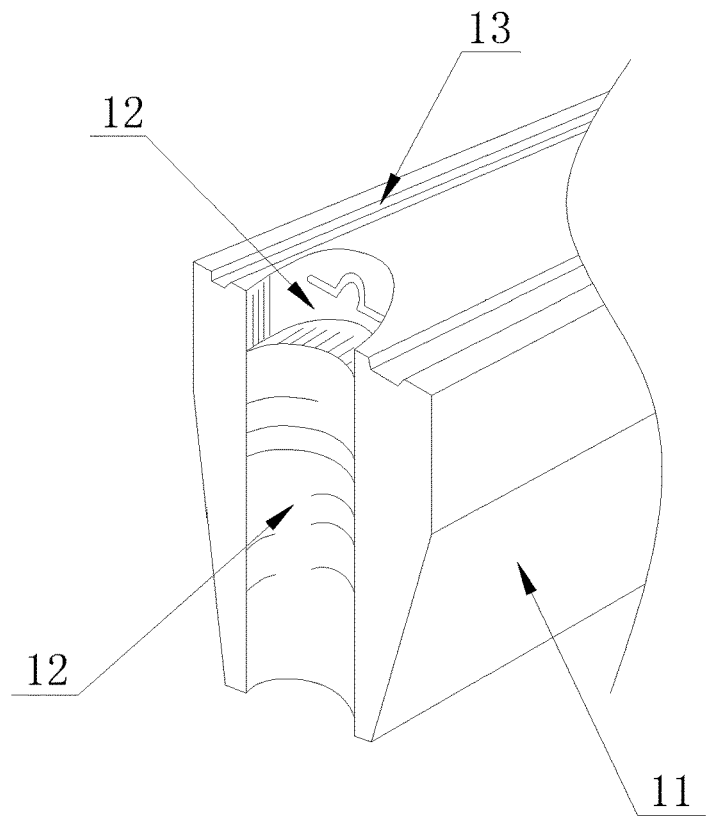
FIG. 8 is a local structural schematic of the third embodiment of the present invention.
Figure 11:
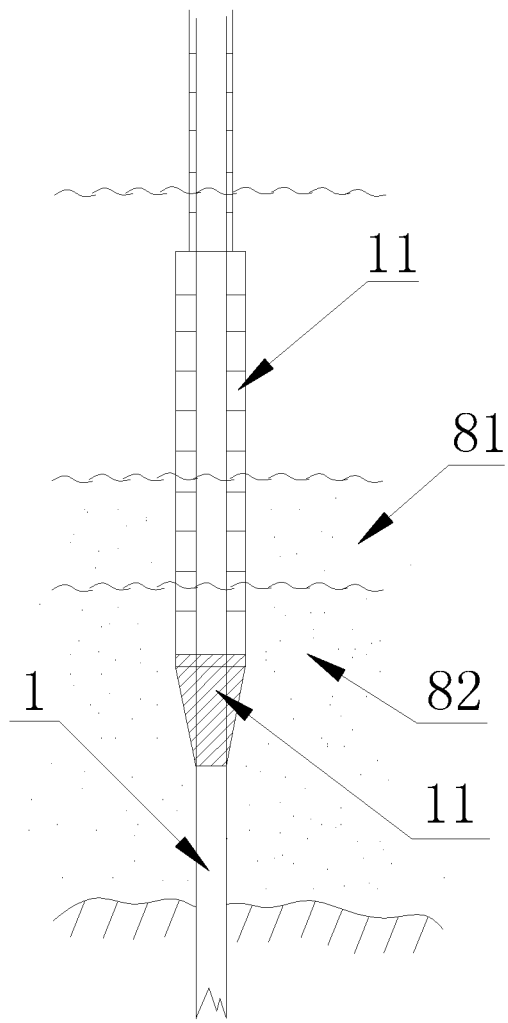
FIG. 11 is a schematic of method embodiment 1 of the present invention applied in an earth bottom.

FIG. 7 shows an alternative embodiment of a brick provided by the present invention. The brick is used as a bottom brick and particularly suitable for the use when the water bottom is earth. Different from the foregoing first embodiment, the thickness of the lower part of the brick body 11 decreases gradually from up to down, or in other words, the cross section forms an inverted cone, tongue-and-groove positions 13 are not disposed on the lower end face of the brick body 11 and are disposed only on the upper end face to match the tongue-and-groove positions 13 on the lower end faces of other bricks. When bottom bricks are put to water bottom, they enter a loose earth layer 81 at first. Under the effect of gravity of bricks in the upper layer, the bottom bricks go deeper to water bottom, enter a solid earth layer 82 and continue to go deeper in the solid earth layer 82 until they do not move any more. It is a stable state. In this way, bottom bricks can more easily and stably enter a solid earth layer 82, thereby assuring seawater or river water won't leak from wall bottom after the dike is built up (as shown in FIG. 11). Still further, the depth of the upper part of the slot position 12 of the brick body 11 is greater than the depth of the lower part (as shown in FIG. 8). The depth refers to the distance a slot position 12 is extended to the middle part of the brick body 11 along the length direction of the brick body 11. This approach helps adjust the bottom brick to a horizontal position and assure the stability of the wall.

Embodiment 4

Figure 9:
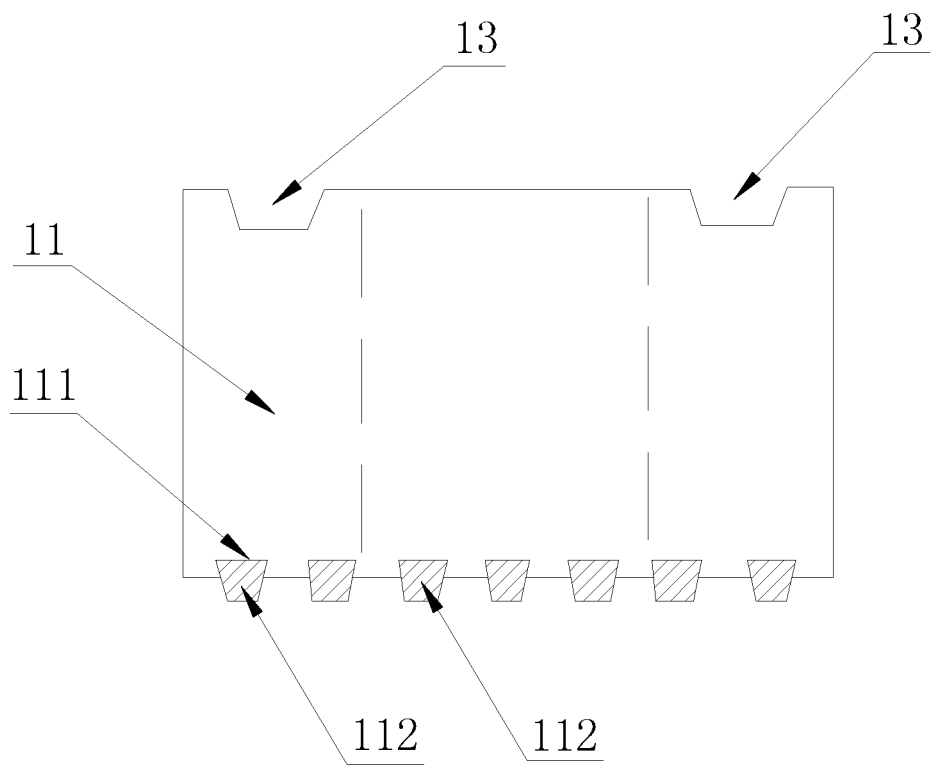
FIG. 9 is a structural schematic of the fourth embodiment of the present invention.
Figure 12:
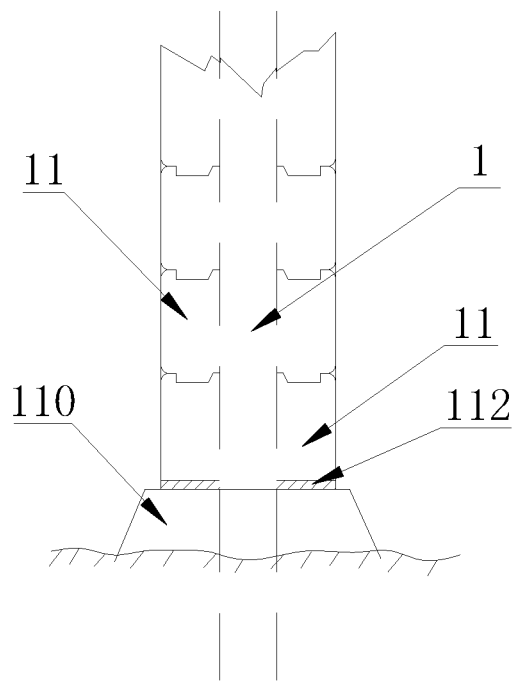
FIG. 12 is a schematic of method embodiment 1 of the present invention applied in a gravel bottom.

FIG. 9 shows an alternative embodiment of a brick provided by the present invention. Likewise, the brick is used as a bottom brick and particularly suitable for the use when the water bottom is gravel. Different from the foregoing embodiment 3, the lower part of the brick body 11 is not a gradually diminishing cone, but may be a rectangle with equal thickness or a trapezoid with a thicker lower part. A number of pit slots 111 are disposed on the bottom surface of the brick body 11 and contain adhesive rubber blocks 112. During use, a concrete pedestal 110 is built at the gravel bottom at first. The upper end face of the pedestal 110 is a flat and horizontal plane. Bottom bricks are stacked up on the pedestal 110 and bonded tightly and resist water through adhesive rubber blocks 112, as shown in FIG. 12.

Figure 10:
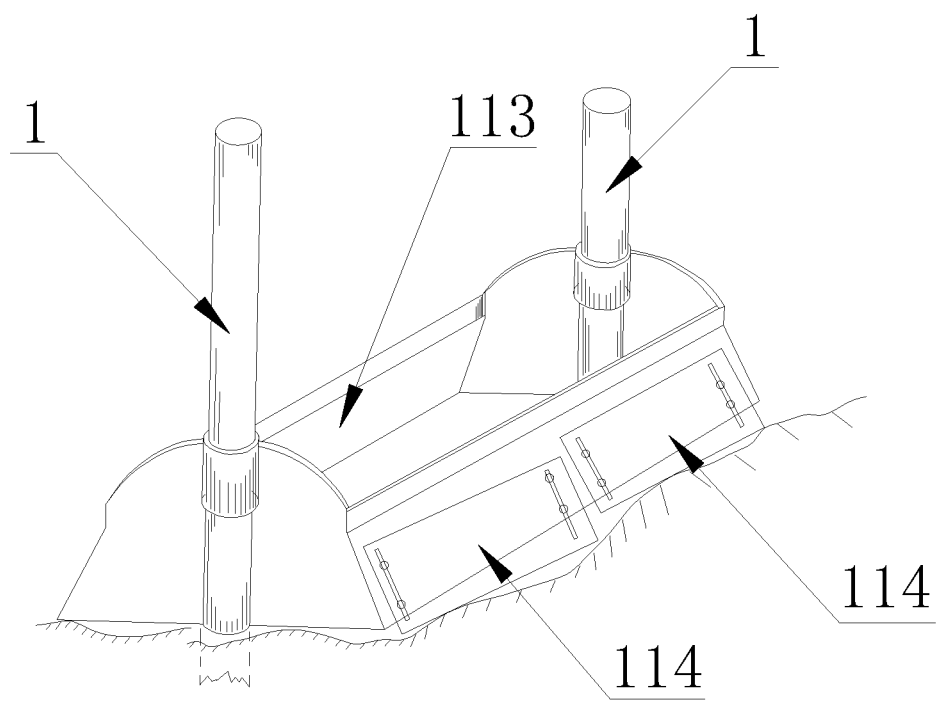
FIG. 10 is a structural schematic of a balancing stand used cooperatively with the fourth embodiment of the present invention.

The concrete method for building the pedestal 110 may be as follows: a balancing stand 113 is erected at water bottom (as shown in FIG. 10), the height of every side of the balancing stand 113 is adjusted to make the top surface horizontal, and concrete is cast into the balancing stand 113 to from a pedestal 110, thereby making the top surface of the pedestal 110 a horizontal plane (specifically, in this embodiment, boards 114 with adjustable positions are disposed on the outer sides of the balancing stand 113. When one side of the balancing stand 113 contacts the highest seabed stone surface between two concrete columns 1, it is defined as a balance point. The positions of the boards 114 are adjusted till they can put up the balancing stand 113). Then bottom bricks are put down. When the bottom bricks press the pedestal 110, the adhesive rubber blocks 112 of bottom bricks are dispersed and bond the concrete pedestal 110 tightly under the action of pressure, thereby making the bottom bricks tightly bond the concrete pedestal 110 and assuring firmness of the wall. Preferably, pit slots 111 are in a shape of inverted trapezoid, more conducive to clamping the adhesive rubber blocks 112 so that they won't fall off when bottom bricks are putting down.

Method Embodiment 1

The present invention further relates to a method for using the aforesaid bricks to build dikes, including the following steps:

(1) drilling a plurality of pile holes at water bottom.

(2) casting concrete into each of the pile holes to form concrete columns 1, wherein the wall in this embodiment is a single-row wall, i.e.: the drilled pile holes and formed concrete columns 1 are extended to form a single row (FIG. 11 is a side view and takes an earth bottom for example; FIG. 12 is a side view and takes a gravel bottom for example).

Figure 13:
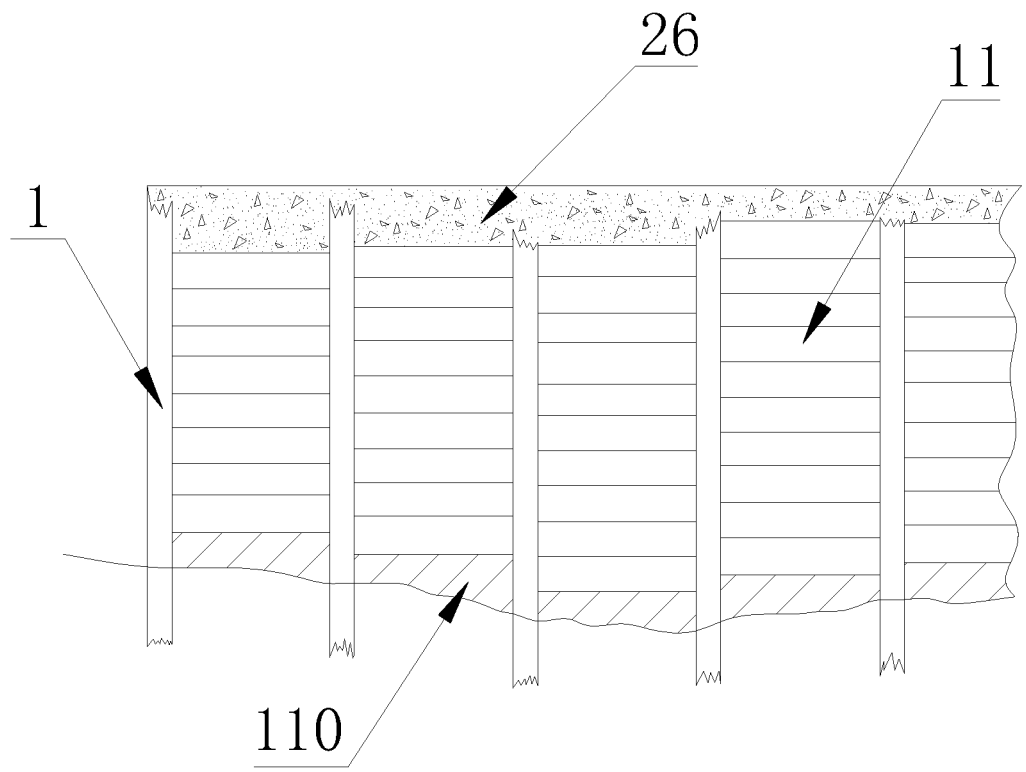
FIG. 13 is a schematic of method embodiment 1 of the present invention applied in a gravel bottom in an alternative direction.

(3) stacking up a number of the bricks at water bottom and along the concrete columns and having them tightly connected to form a wall, wherein bricks are laid between two adjacent concrete columns 1 (FIG. 13 is a front view and takes a gravel bottom for example). This approach makes the stacking of bricks more flexible and more adjustable, helps maintain the horizontally of bricks and can more easily assure water resistance of the wall. In this embodiment, water resistance is achieved through tight connection of a waterproof adhesive layer 14 between bricks. Alternatively, other waterproof structures may be adopted.

(3-1) casting concrete along hollow walls 15 and/or hollow columns 151 of bricks to form a waterproof wall 17 after the bricks are stacked up into a wall. The effects of the hollow walls 15 and the hollow columns 151 are not described again here. Under the circumstance of building a waterproof wall 17 as described in this step, requirements for waterproof structure of bricks may be omitted even if bricks with flat upper and lower surfaces are simply stacked up. When a concrete waterproof wall 17 is formed, it can still seal off the clearance between upper and lower bricks and firmly bond bricks to it; however, addition of tongue-and-groove positions 13 on bricks may increase the interference-fit force between bricks, further avoid impact of bricks by seawater, causing damage of the wall, and effectively assure the stability of the wall (as shown in FIG. 3). The waterproof adhesive layer 14 further raises the adhesive power and water resistance between bricks.

Still further, when the height of stacked bricks is close to the presupposed dam crest (it may be about 50-90 cm from the dam crest), a concrete beam 26 is built on the top surface of the stacked bricks. The weight of the concrete beam 26 may further compact the brick body 11 under it, thereby making the brick body 11 more stable; meanwhile it also helps flatten the top surface of bricks and carry out other works of the wall, as shown in FIG. 13.

By now, the wall surface formed between every two adjacent concrete columns 1 has been firmly built up and can effectively resist water.

Figure 14:
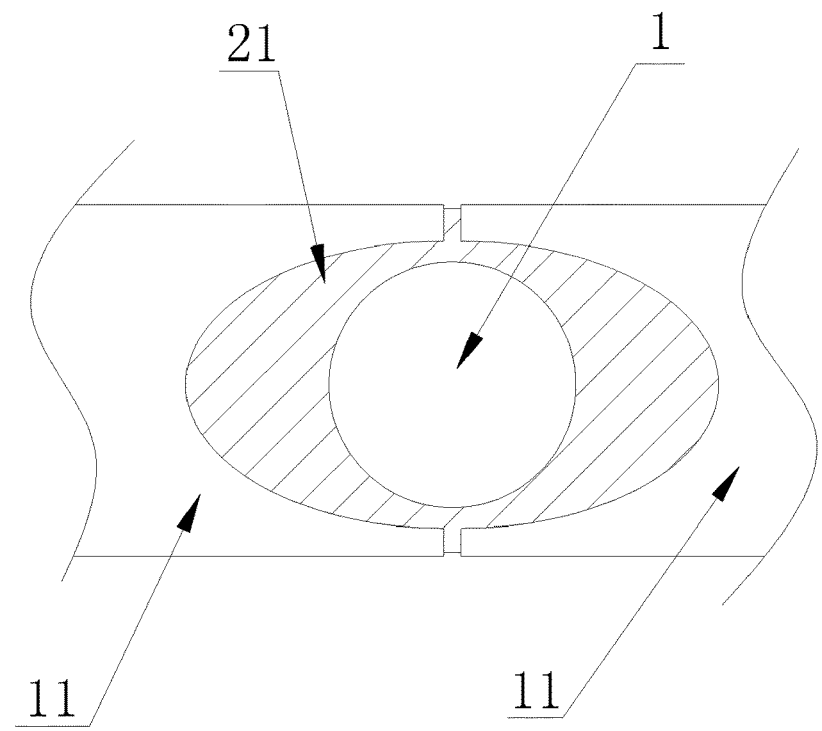
FIG. 14 is a structural schematic of a waterproof structure between a brick in the method provided by the present invention and a concrete column.

(4) Waterproof filler 21 is filled in the clearances between the concrete columns 1 and the bricks. Preferably, mortar is adopted in this embodiment. As the clearances between the concrete columns 1 and the bricks are very small, mortar can effectively enters and fills up the clearances. After solidification, mortar can tightly bond concrete columns 1 and bricks, seal the clearances and assure the water resistance between wall surfaces; when excessive mortar is used, the clearance between wall surfaces may be further filled (as shown in FIG. 14, the figure is a top view). If the reserved clearances between bricks and concrete columns 1 are large during design of the dimensions of the brick body 11, concrete or concrete+mortar may be used as waterproof filler 21.

Method Embodiment 2

Figure 15:
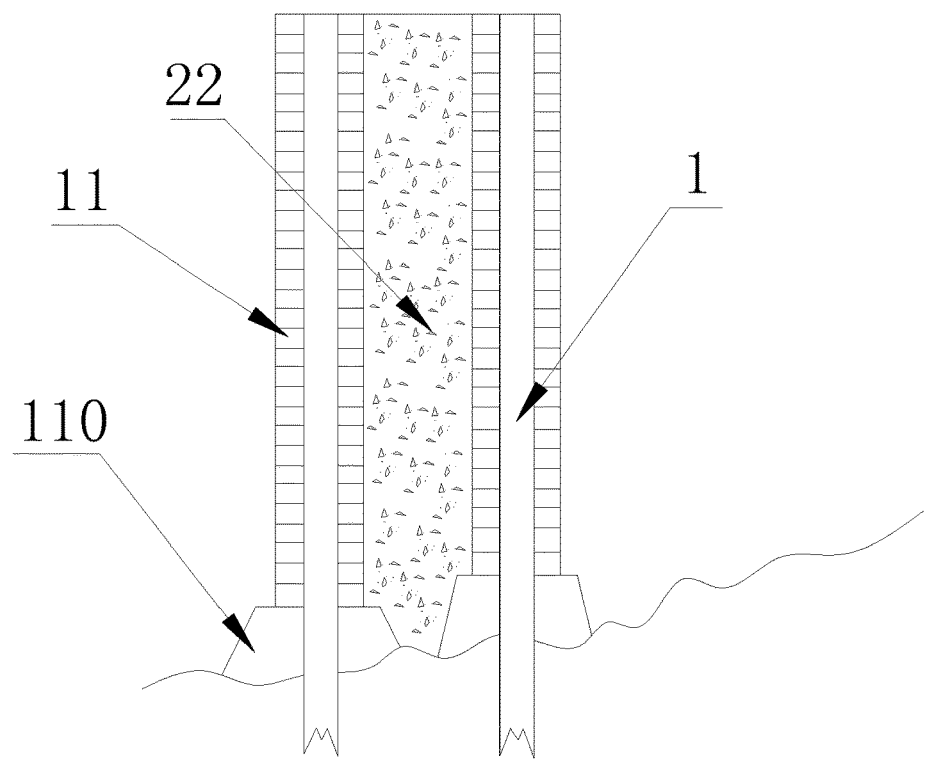
FIG. 15 is a schematic of method embodiment 2 of the present invention applied in a gravel bottom.
Figure 16:
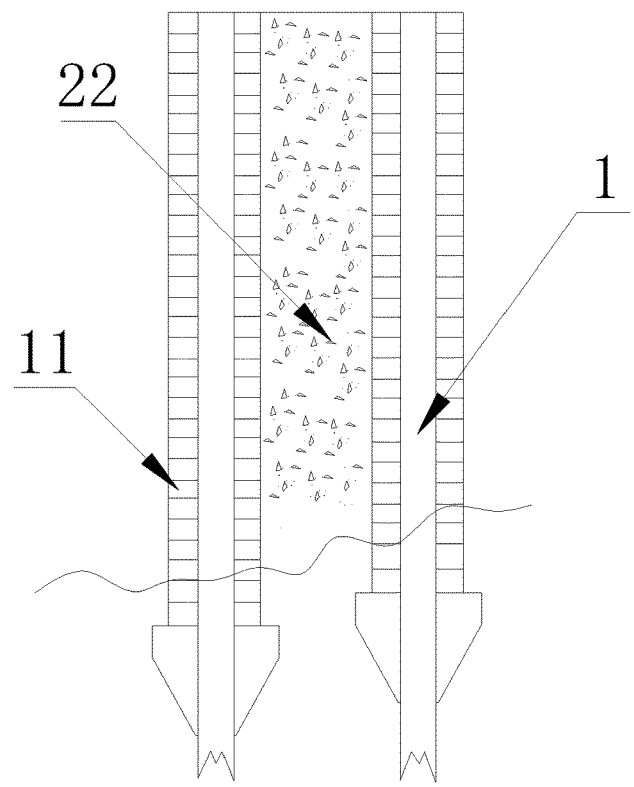
FIG. 16 is a schematic of method embodiment 2 of the present invention applied in an earth bottom.

As shown in FIG. 15 and FIG. 16 (FIG. 15 and FIG. 16 are both side-view schematics. FIG. 15 shows a circumstance of gravel bottom and FIG. 16 shows a circumstance of earth bottom), the method of this embodiment has the following difference from the foregoing method embodiment 1: in the step (1), the pile holes are arranged in two rows; in the step (3), two rows of walls are formed along the concrete columns on the two rows of pile holes, and there is a clearance between the two rows of walls. There is also a step (5): filling a concrete layer 22 in the clearance between two rows of walls to make the two rows of walls connected into a whole-layer wall. In the step (5), before filling of concrete, water in the clearance is pumped out at first. Alternatively, large hornstones or other materials may be put in as foundation filling at first, and then concrete is cast. Or alternatively, 1:1:1 dry concrete is used to harden the mud slurry at water bottom at first, and then high-performance concrete is poured. Such double-row wall dike structure is more stable and suitable for deep and wavy sea areas and may meet the need of 15-20 m water depth.

As a concrete layer 22 is filled in the clearance between double-row walls, it has a waterproof effect similar to that of the hollow wall 15 mentioned in the foregoing embodiment 1 in addition that the concrete layer 22 can thicken the wall body and improve the stability of the wall. Therefore, there is no need to arrange hollow walls 15 for single brick.

Method Embodiment 3

Figure 17:
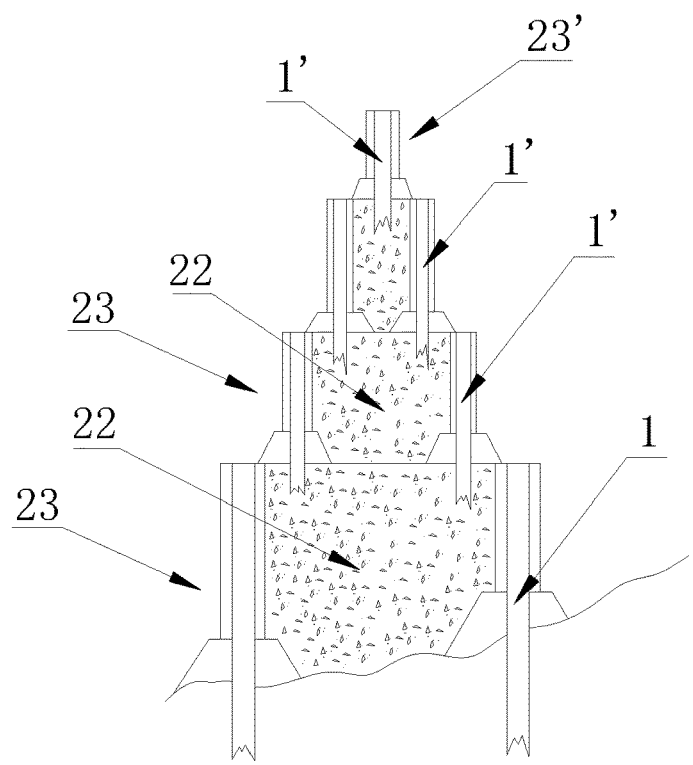
FIG. 17 is a schematic of method embodiment 3 of the present invention applied in a gravel bottom.
Figure 18:
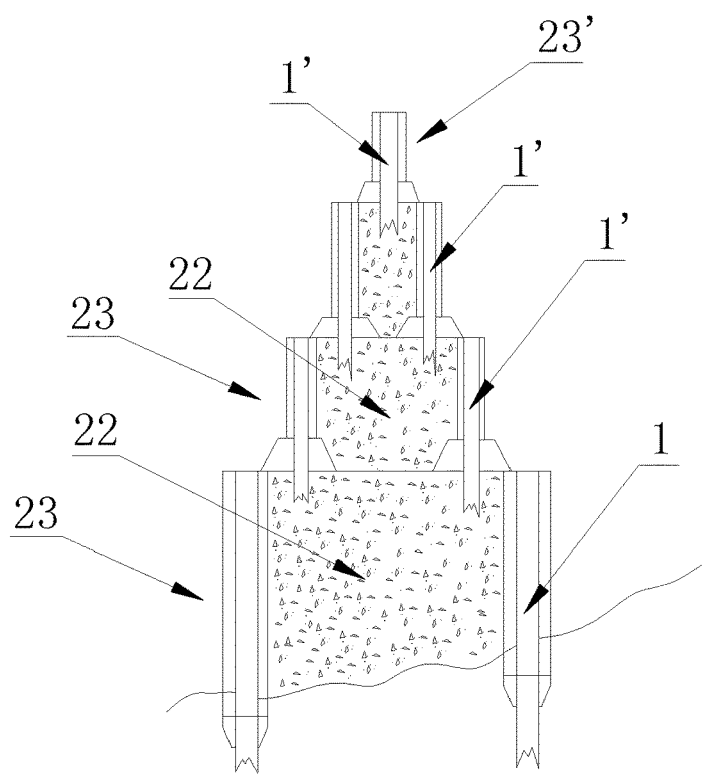
FIG. 18 is a schematic of method embodiment 3 of the present invention applied in an earth bottom.

As shown in FIG. 17 and FIG. 18 (FIG. 17 and FIG. 18 are both side-view schematics. FIG. 17 shows a circumstance of gravel bottom and FIG. 18 shows a circumstance of earth bottom), the method of this embodiment has the following difference from the foregoing method embodiment 2: there is also a step (6): on the formed whole-layer wall 23, steps (1)-(5) are repeated to build double-row whole-layer walls 23 until the integral wall composed of multiple layers of whole-layer walls 23 meets height requirements. As water pressure increases with water depth, for a seabed with a water depth of 30-100 m or more, even if the length of a single concrete column 1 can meet the requirements, its stress capability cannot be assured. Therefore, multiple layers need to be built and certain limitation is set to wall height of every layer (about 10-60 m a layer for example). Specifically, repeating steps (1)-(5) refers to considering the top surface of a whole-layer wall 23 built up each time as "seabed", drilling pile holes and building concrete columns 11' on this top surface, stacking up bricks between the concrete columns 11' to form a wall, and casting concrete between two rows of walls to form a new layer of whole-layer wall. Each layer of integral wall 23 only needs to retract a certain distance on the foundation of the lower layer.

As a wall needs to be built on the basis of a whole-layer wall 23, double-row wall is more stable and can more easily realize drilling on the top surface of the wall. The top surface of a concrete wall is hard, so step 6 may refer to the construction method of gravel bottom; if the top surface of a whole-layer wall 23 is flat and horizontal enough, the construction of a pedestal 110 is not needed and instead, bottom bricks may be put down directly. Further, in the step (6), the wall in top layer is a single-row wall 23' to simplify construction.

Figure 19:
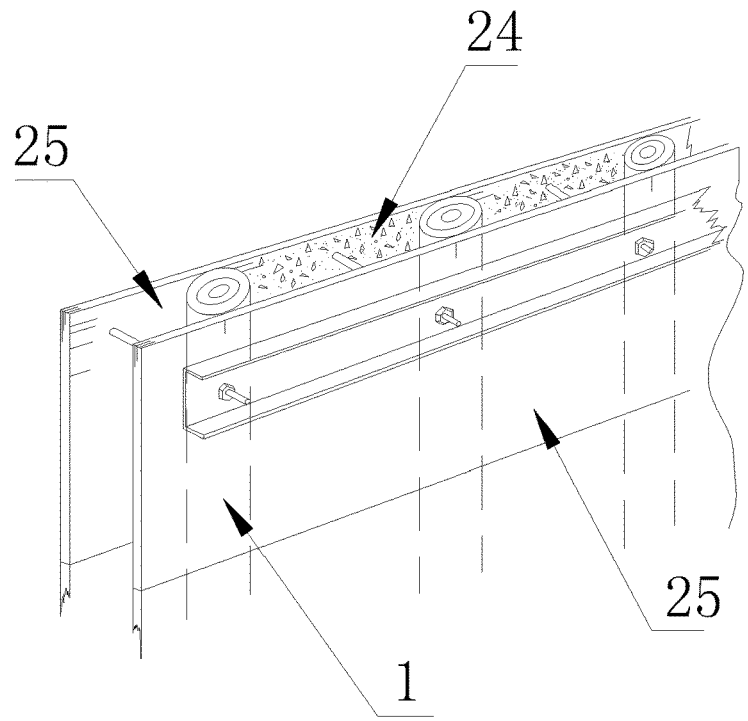
FIG. 19 is a schematic of an alternative application mode of the method provided by the present invention.

Further, the method for building a single-row wall may also be as shown in FIG. 19, including the following steps: (1) drilling a plurality of pile holes at water bottom; (2) casting concrete into each of the pile holes to form concrete columns 1; (3) filling wall filler on the contour surface outside concrete columns 1 and along multiple concrete columns 1 (the wall filler in this method is concrete. In the foregoing embodiments, brick may also be deemed as wall filler) to form a concrete wall 24. Concrete is filled to form a concrete wall 24. To be specific: two or more concrete columns 1 form a group, formworks 25 are inserted on the two sides of every group of concrete columns 1, and concrete is cast between the formworks 25 to form a concrete wall 24.

Figure 20:
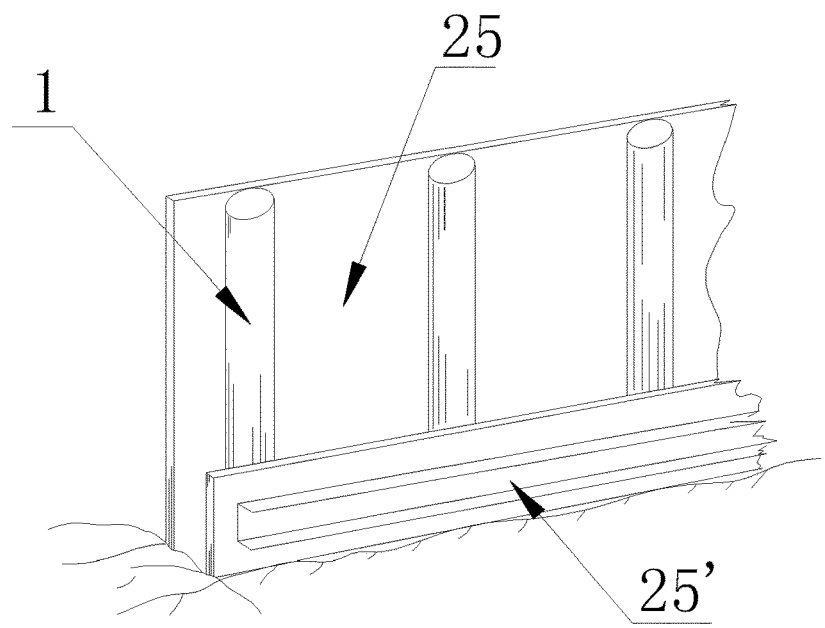
FIG. 20 is a schematic of an alternative application mode of the method provided by the present invention.

Subject to the actual condition, the step of casting concrete should be understood to have included the process of clearing sea sand or mud, which will not be described again here. More specifically, short formworks 25' may be erected at first to make for clearance of sea sand and mud between the formworks (as shown in FIG. 20), and then formworks 25 are erected to build a whole wall. The formworks 25 may be steel formworks or made of other materials as long as the shape can be formed. The construction operation of this method is simple, and suitable for shallow water areas (0-5 m deep), or construction of every single-row wall of the foregoing two rows of walls. As concrete is directly solidified into a concrete wall 24, the wall and concrete columns 1 are directly bonded into an integral body, without any gap; when next group of walls are built, the waterproof effect between them and the original wall can be assured without taking extra measures.

Figure 21:
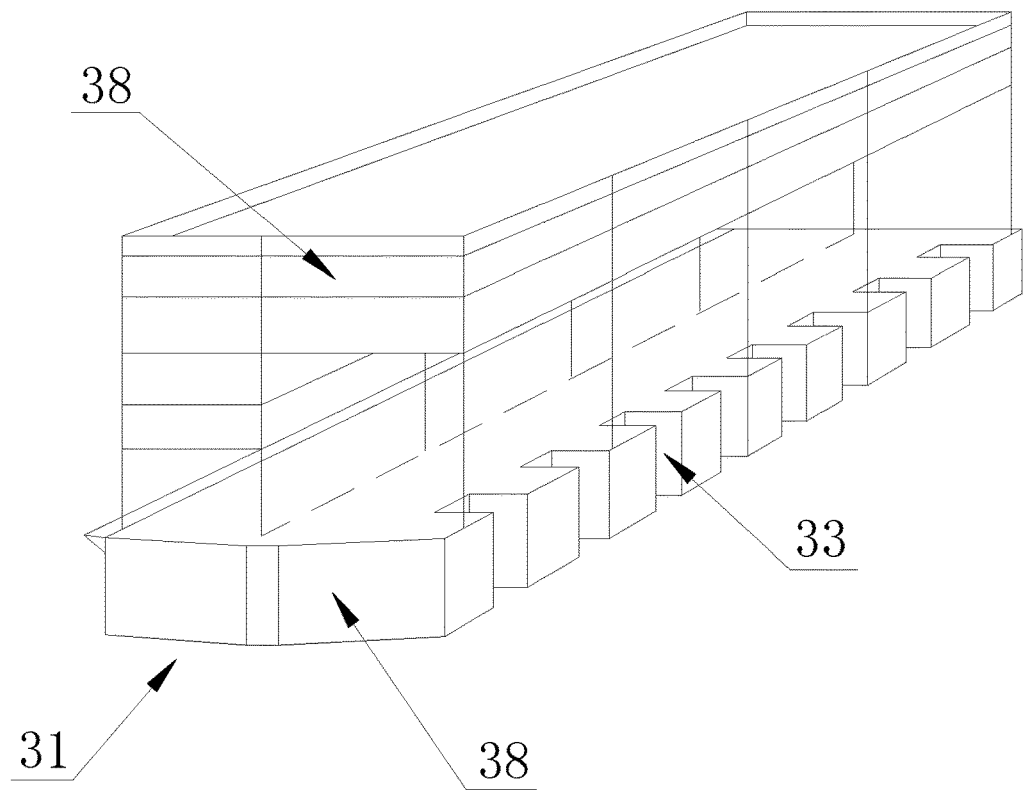
FIG. 21 is a stereoscopic schematic of a skeleton structure of a drilling ship used cooperatively with the present invention.
Figure 22:
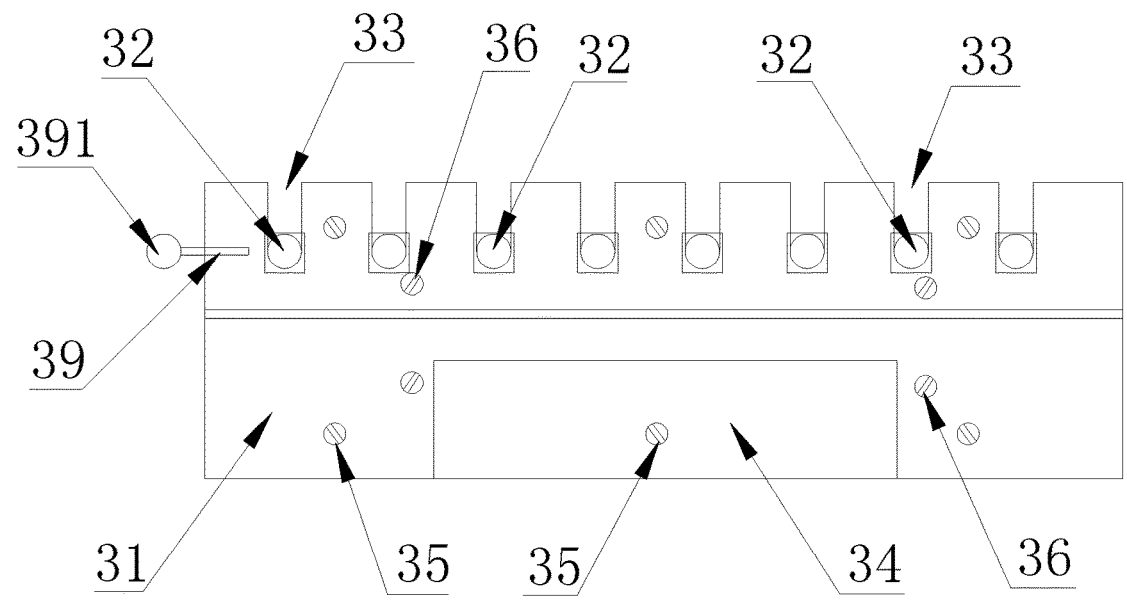
FIG. 22 is a top-view schematic of a drilling ship used cooperatively with the present invention.
Figure 28:
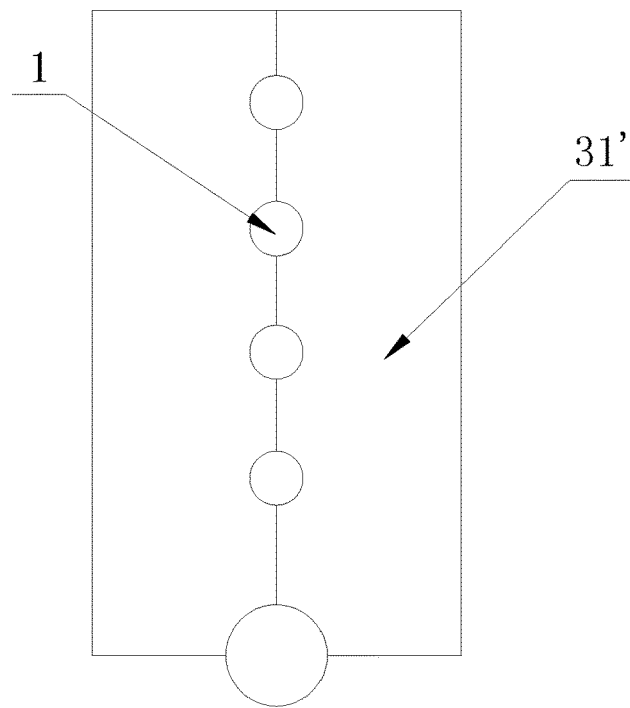
FIG. 28 is a structural schematic of a drilling ship used cooperatively with the present invention and in an alternative form.
Figure 29:
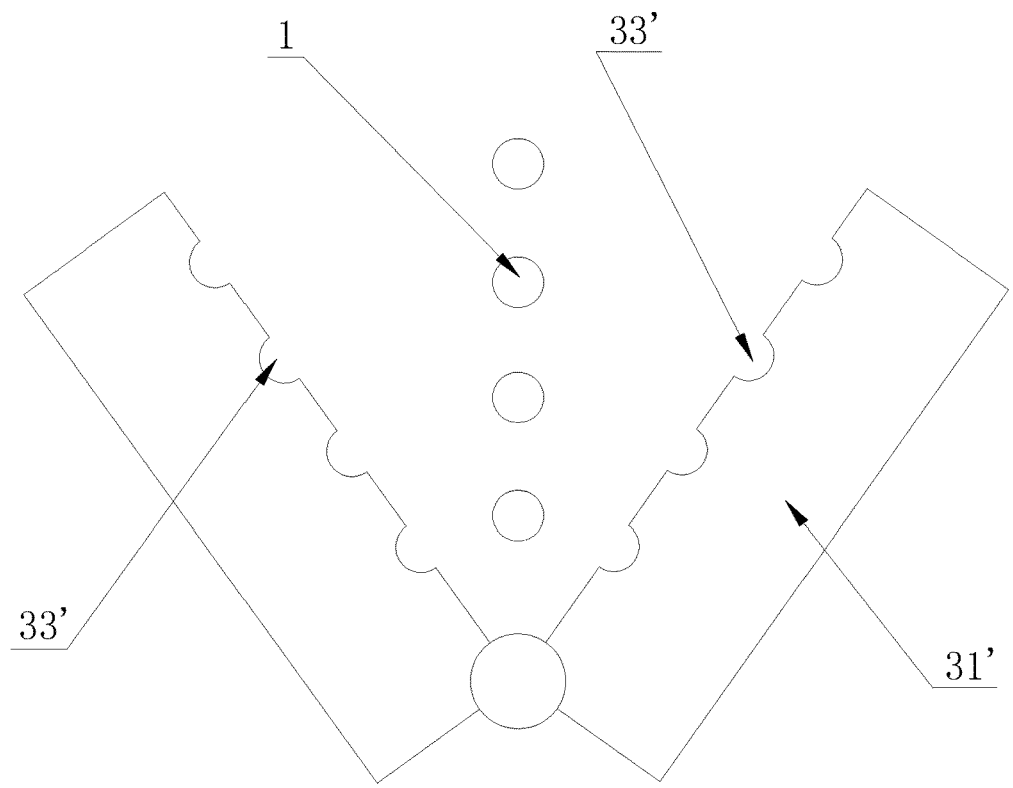
FIG. 29 is a structural schematic of a working-state drilling ship used cooperatively with the present invention and in an alternative form.

Tools:

In the present invention, pile holes may be drilled by an underwater drilling machine, or by an above-water drilling ship by drilling directly from above water to under water. A drilling ship for drilling and column building may adopt a form shown in FIG. 21-FIG. 26, to be specific: an engineering drilling ship, comprising a ship body 31, wherein a drilling rig device 32 is disposed on a side of the ship body 31, and comprises a drilling rig body 321, a drill stem 322, a drill bushing 323 and a mud pit 324; a chasm 33 for release of finished columns from the ship body 31 is disposed on the edge of a side of the ship body 31 disposed with a drilling rig device 32, and the position of the chasm 33 corresponds to the position of the drilling rig device 32. The effect of the chasm 33 is to release finished concrete columns 1 from the ship body. Preferably, the chasm 33 is arranged on one side of the ship body 31 to make for release, as shown in FIG. 21 and FIG. 22. In reality, the drilling rig device 32 may be arranged in the middle of the ship body 31', and the release structure 33' (equivalent to chasm 33) may also be arranged in the middle. After concrete columns 1 are built up, the ship body 31' only needs to be unfoldable along the centerline to expose the release structure 33' so that the ship body 31' may be released from the finished concrete columns 1 (as shown in FIG. 28 and FIG. 29, the direction shown in the figures is a top-view direction).

Figure 25:
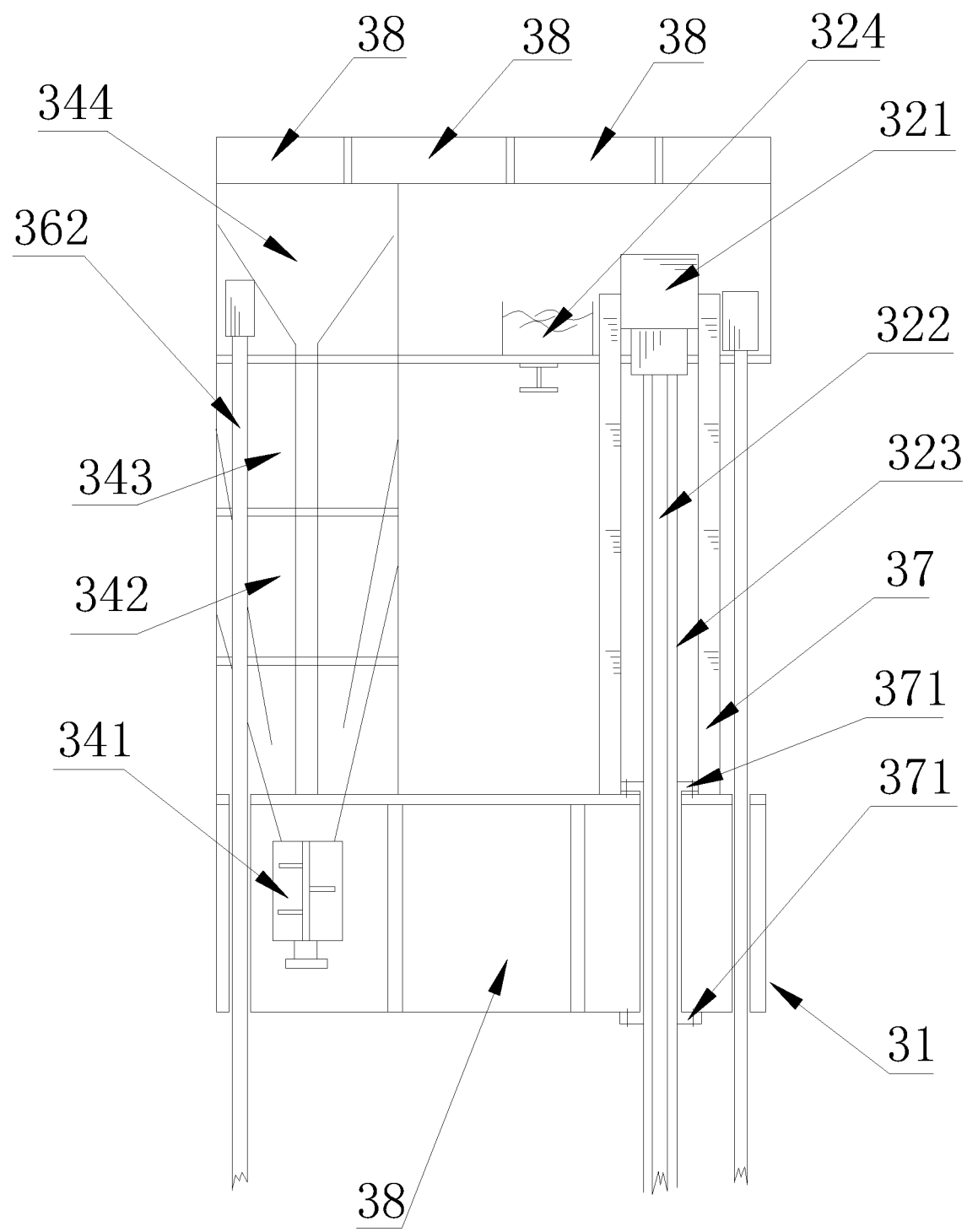
FIG. 25 is a front-view schematic of a drilling ship used cooperatively with the present invention.

In this embodiment, as shown in FIG. 22, there are a plurality of drilling rig devices 32 and they are distributed in an equal space; the chasms 33 and drilling rig devices 32 match each other in quantity and are opposite in position. According to different shipbuilding cost, scale and service environment, different quantity of drilling rig devices 32 may be built. A concrete production unit 34 is disposed on the ship body 31 and on the side of the ship body 31 opposite to the drilling rig devices 32. The drilling rig devices 32 and the concrete production unit 34 are on two different sides of the ship body 31 and help maintain balance and stability of the ship body 31. The concrete production unit 34 comprises an agitator 341, a macadam compartment 342, a sand compartment 343 and a cement and water compartment 344, which are above the agitator 341 and communicable, as shown in FIG. 25.

Figure 23:
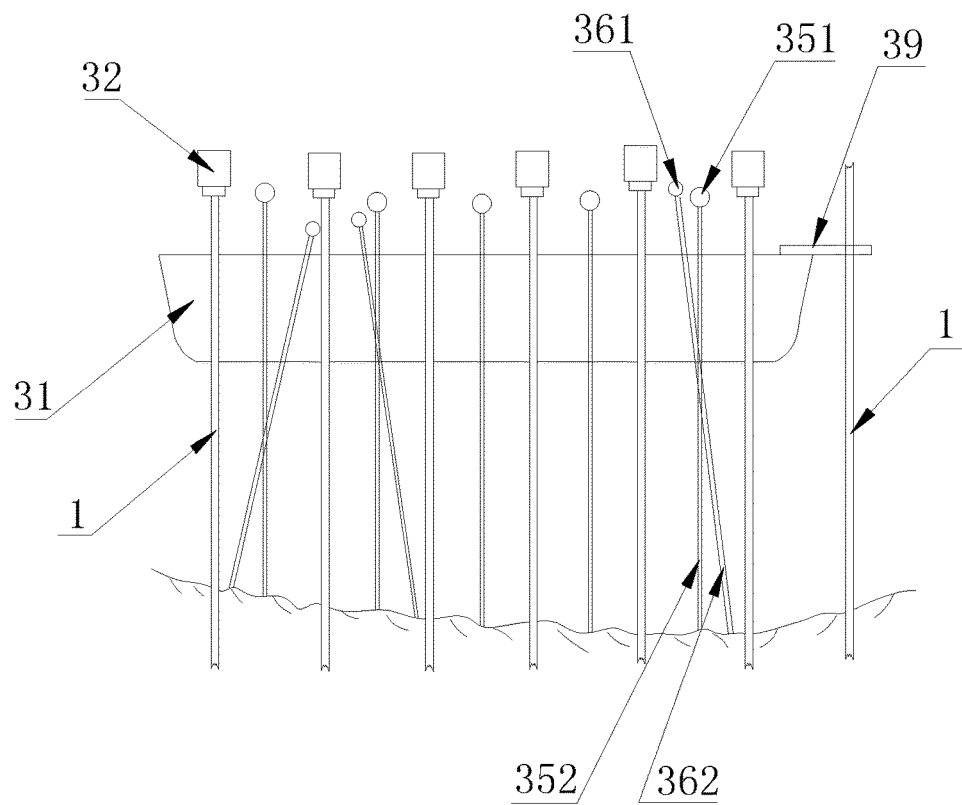
FIG. 23 is a schematic of a working-state drilling ship used cooperatively with the present invention.
Figure 24:
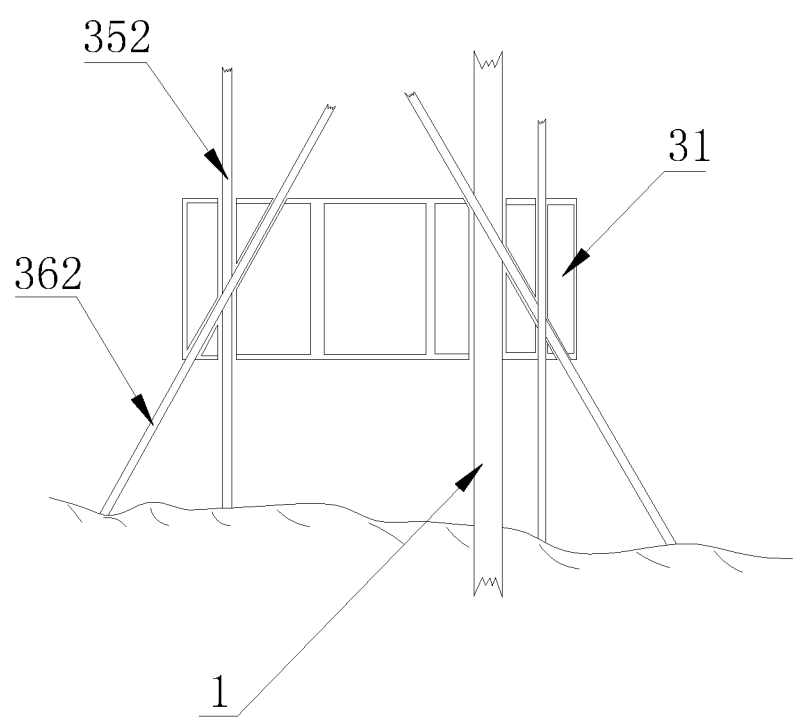
FIG. 24 is an alternative schematic of a working-state drilling ship used cooperatively with the present invention.

As shown in FIG. 23, the ship body 31 further comprises a number of vertical hydraulic units 35 and a number of oblique hydraulic units 36 (according to the actual need, it is allowed to have only vertical hydraulic units 35 or only oblique hydraulic units 36). Each vertical hydraulic unit 35 comprises a first hydraulic machine 351 and a vertical hydraulic column 352. The vertical hydraulic column 352 is perpendicular to the deck of the ship body 31. The first hydraulic machine 351 is used to drive the vertical hydraulic column 352. Each oblique hydraulic unit 36 comprises a second hydraulic machine 361 and an oblique hydraulic column 362. The oblique hydraulic column 362 forms a non-vertical included angle with the deck of the ship body 31, and the second hydraulic machine 361 is used to drive the oblique hydraulic column 362. The effect of the vertical hydraulic columns 352 and the oblique hydraulic columns 362 is to lift the ship body 31 through their support force, and to reduce and even eliminate the buoyancy of seawater (or river water) to the ship so as to make the ship body 31 free from the impact of undercurrents in water and free from swing of waves, and guarantee the drill stem 322 won't be dislocated during drilling, causing failure of drilling. After the vertical hydraulic columns 352 and the oblique hydraulic columns 362 are extended to water bottom, adjusting the length of the vertical hydraulic columns 352 and the oblique hydraulic columns 362 may assure the ship body 31 maintains horizontal, as shown in FIG. 23 and FIG. 24. Besides, the effect of the oblique hydraulic columns 362 is to flexibly regulate the direction of the ship body 31. When one of the oblique hydraulic columns 362 is extended to water bottom, as the oblique hydraulic column 362 forms a non-vertical included angle with the ship body 31, the oblique hydraulic column 362 may generate a horizontal push on the ship body 31 and make the ship body 31 movable, thus adjusting the position of the ship body 31 and ensuring the drilling positions during construction meet the requirements for construction positions. For example, they form a straight line with the already built concrete columns 1.

As shown in FIG. 22, the quantity of the vertical hydraulic units 35 is at least four, and they are disposed at the four end angles of the ship body 31. In this embodiment, a vertical hydraulic unit 35 is disposed on each of the two sides in the middle of the ship body 31; the quantity of the oblique hydraulic units 36 is two at least. In this embodiment, the quantity is four and they are close to the four end angles.

The ship body 31 comprises a number of sealing column sleeves, for passing of drill stems 322 or hydraulic columns (352, 362) The concrete method for preparing sealing column sleeves may be as follows: making symmetric large steel cylinders for passing of hydraulic column positions, as well as U-shaped semi-circle steel cylinders (or right-angle "凹" shaped or "凵" shaped steel cylinders) for passing of drill bushings 323 at first and manufacturing the steel cylinders and the ship body 31 together to ensure seawater won't seep into compartments during work. The U-shaped semi-circle steel cylinders (or right-angle "凹" shaped or "凵" shaped steel cylinders) are for passing of drill bushings 323 and drill stems 322. As they have openings, concrete columns 1 may be released from the ship body 31 after concrete is cast to form concrete columns 1. In other words, U-shaped semi-circle steel cylinders (or right-angle "凹" shaped or "凵" shaped steel cylinders) may be used to make chasms 33.

Figure 26:
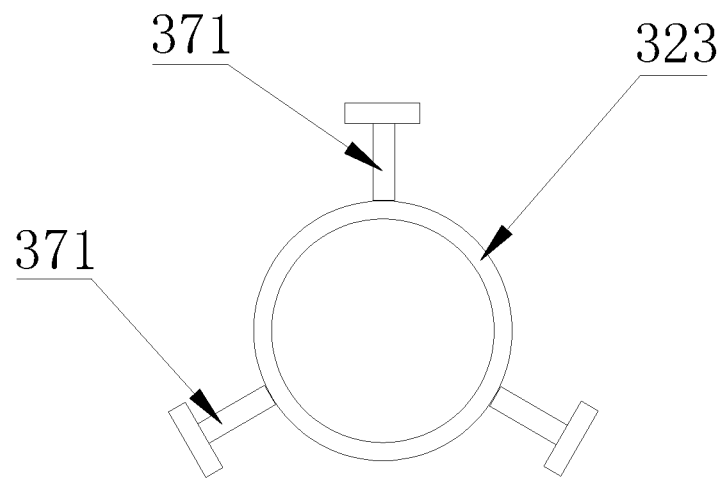
FIG. 26 is a schematic of a working-state drill bushing tightening structure of a drilling ship used cooperatively with the present invention.

As shown in FIG. 25, this embodiment further comprises support frames 37, and the support frames 37 and the drilling rig devices 32 are consistent in quantity; drilling rig devices 32 are mounted onto the ship body 31 through support frames 37; the extension direction of the support frames 37 is perpendicular to the deck of the ship body 31. Further, in order to reduce shaking of drill bushings 323 and assure drilling quality, the support frames 37 further comprise tightening structures 371 for tightening drill bushings 323. Specifically, in this embodiment, the tightening structure 371 are two groups of tightening screws, each group has at least two tightening screws, preferably three evenly distributed tightening screws. After all screws are tightened, the end of each screw is against the exterior wall of a drill bushing 323, thereby limiting the shaking of the drill bushing 323 in the contact position, as shown in FIG. 26; after two groups of screws are both tightened, the drill bushing 323 is tightened and limited at two locations, thereby limiting the overall shaking of the drill bushing 323.

Airtight compartments 38 are disposed at the bottom and top of the ship body 31. There are multiple airtight compartments 38 and they are mutually isolated. Even if one airtight compartment 38 is damaged and water enters it, the air-tightness of other airtight compartments 38 can still be guaranteed to assure the ship is safe and won't tip over or capsize.

Figure 30:
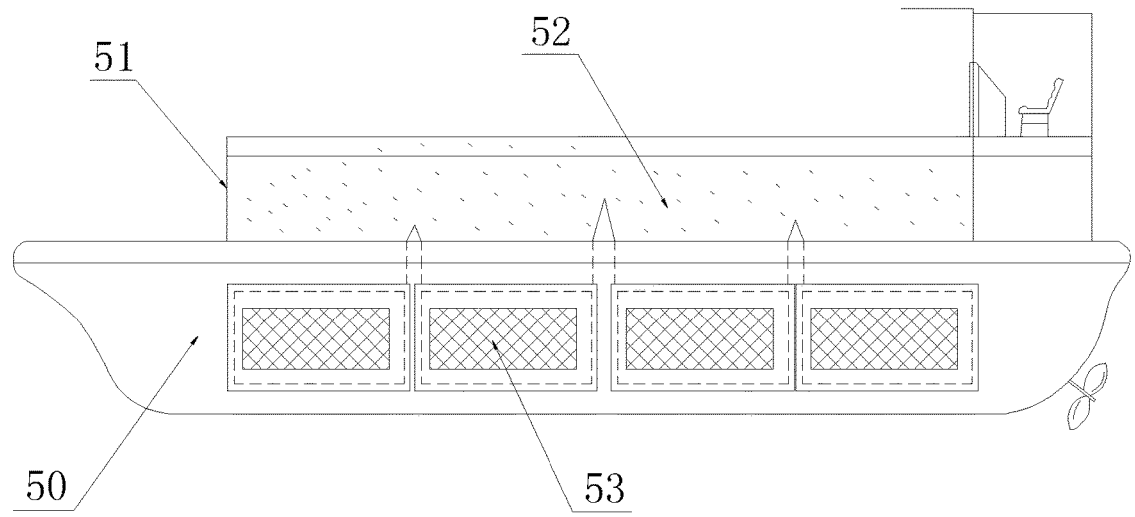
FIG. 30 is a side view of a sand dumping ship used cooperatively with the present invention.
Figure 31:
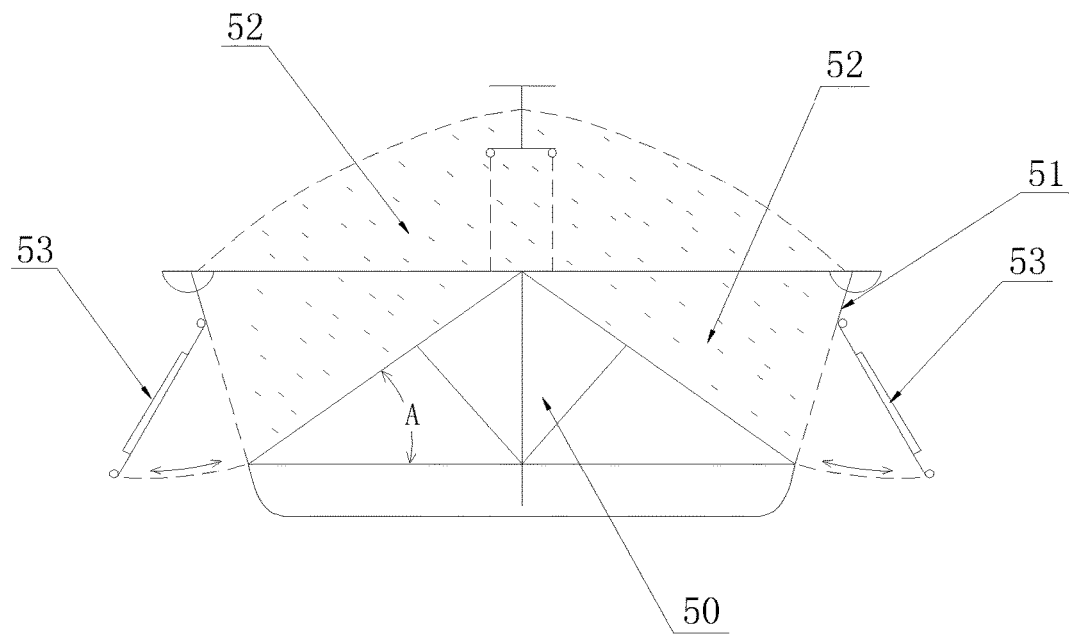
FIG. 31 is a front view of a sand dumping ship used cooperatively with the present invention.

As shown in FIGS. 30 and 31, a sand dumping ship is used to unload sand or rock in the sea. The dumping ship comprises a bulge 50 and hull plates 51 located on the bulge 50 and oriented in front, rear, left and right directions. The hull plates 51 enclose to form a compartment 52 for storing sand. The interior of the bulge 50 is airtight compartment. The width of the upper portion of the bulge 50 is gradually increased from top to bottom. Preferably, in this embodiment, the shape of the bulge 50 is triangular. The manufacture thereof is simple and it is easy to unload the sand 52. The shape of the bulge 50 can be also elliptical arc, hill shaped, etc., as long as it is inclined. There are sand doors 53 on the hull plates 51 located at two sides. The upper end of the sand door 53 is pivotally connected to the hull plate 51. The lower end of the sand door 53 is releasably connected to the bulge 50 or the hull plate 51, in particular, by snap locks, latches or cable connection. When the sand dumping ship operates on the sea, connection elements (such as snap locks and cables etc.) between the sand doors 53 and the bulge 50 are released so that the sand doors 53 can move freely under action of external force. Under the force of weight of sand 52, the sand doors 53 will be automatically opened and the sand 52 will be unloaded to the sea. At the same time, unloading the sand 52 from both sides results in a more bumpy sea, and thus speeds up the dumping rate. Further, the angle between the inclined surface of the bulge 50 and the horizontal surface (i.e. the angle A shown in FIG. 31) is at least 40°, such that when the sand dumping ship bumps on the sea, the inclined angle can exceed 60°, and thus the unloading of sand 52 can be more efficient and effective. If necessary, the sand 52 can also be unloaded on the beach when tide rises. The total displacement of the airtight compartment of the bulge 50 is greater than the total weight of the ship (hull weight and laden weight), so that the ship will not sink, and in the process of unloading the sand, the ship will not sink as well. The sand 52 will be unloaded into the sea first before the ship will turn over, so that the total weight of the ship is reduced and ship becomes easier to float. Furthermore, the hull plate 51 is made of steel sheet having a thickness of 10-15 mm.

Figure 27:
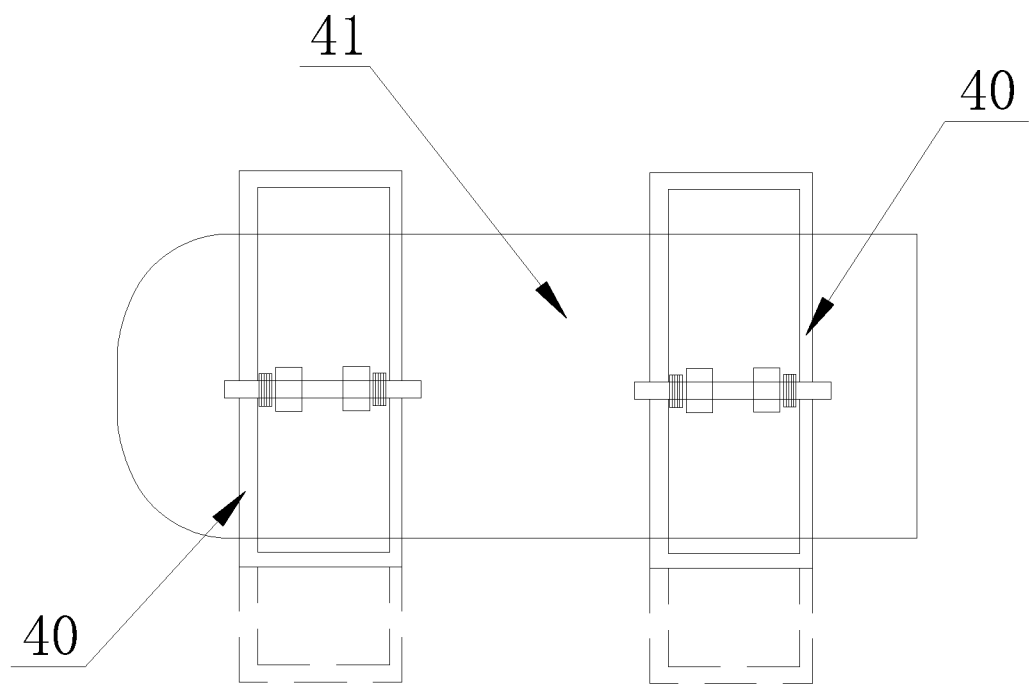
FIG. 27 is a schematic of a lifting structure of a drilling ship used cooperatively with the present invention.

Work process: The engineering drilling ship in the present invention directly sails on a river or sea in the area to be constructed. All vertical hydraulic columns 352 and oblique hydraulic column 362 are adjusted and extended to water bottom to make the ship body 31 in a horizontal state. The quantity of hydraulic columns and the selection of hydraulic machines may be changed according to the actual size of the ship as long as they can stably support the ship body 31. After the ship body 31 becomes stable, the drill bushings 323 and drill stems 322 of each drilling rig device 32 are extended to water bottom and the drilling rig body 321 drives drill stems 322 to start work, thereby drilling pile holes at water bottom. As the ship body 31 maintains horizontal, the drilling rig device 32 fixed by the support frame 37 keeps pile holes vertical and in an equal space, thereby improving the stability after columns are built up. After pile holes are drilled, drill stems 322 are drawn out and concrete is cast to water bottom along drill bushings 323. Before concrete is fully dry, drill bushings 323 keep rotating. In this embodiment, drilling rig devices 32 and concrete production units are disposed on the ship body 31 in the same time, and concrete may be produced on the ship. Meanwhile, as a large amount of macadam is generated during drilling. Mud pit 324 and boreholes form a liquid circulation to pump out macadam generated during drilling as well as slurry in the holes. Macadam is recovered on the ship, and used to produce concrete. According to actual condition, the concrete production unit may be not disposed on the ship, concrete is transported from shore to the ship by a transport ship or a concrete production ship is adopted, but it may lower production efficiency to some extent or raise construction cost to some extent. The concrete production ship comprises a plurality of concrete agitators, mud pits and cabins for storage of sand, macadam, cement and water respectively. All the cabins are communicable with agitators so that the concrete production ship may massively produce concrete. After concrete is dried to form concrete columns 1, the construction in this stage is completed, the engineering drilling ship leaves the current position and the completed concrete columns 1 are released from the ship body 31 through chasms 33 on a side of the ship body 31. When the ship body 31 moves to next construction position, the above process is repeated, and another group of concrete columns 1 are built. Further, connecting racks may be disposed at ends of the ship body 31. The distance of the external end of a connecting rack 39 from the outermost drilling rig device 32 at the same end of the ship body 31 is equal to the space between concrete columns 1. The external end of each connecting rack 39 has a connecting sleeve 391 for fixing a concrete column 1. In this way, next group of concrete columns 1 maintains an equal space with previous group of concrete columns 1. After concrete columns 1 are produced and formed, the drilling ship leaves the original position. Another ship (brick storage ship 41) may be used to carry out brick stacking. Bricks are stacked between concrete columns 1 to form a wall. The brick storage ship 41 has brick storage cabins and a crane 40. Still further, the crane jib of the crane 40 is telescopic, for more flexible handling and adjustment, as shown in FIG. 27.

The above embodiments are only preferred embodiments of the present invention and not intended to limit the protection scope of the present invention. All nonmaterial modifications and replacements made by those skilled in the art on the basis of the present invention all belong to the protection scope of the present invention.

What is claimed is:

1. A brick, comprising a brick body, wherein the brick body comprises at least one slot position for connecting a column; a side of an end face of the brick body comprising an adjusting hole for adjusting the brick to a horizontal position; the thickness of the lower part of the brick body decreasing gradually from up to down, the cross section of the brick body forming an inverted cone; the depth of the upper part of the slot position being greater than the depth of the lower part of the slot position forming a shelf, thereby helping adjust the brick to a horizontal position and assuring stability;

wherein the depth refers to a distance the slot position is extended to the middle part of the brick body along the length direction of the brick body and wherein the shelf is positioned vertically above the decreasing thickness portion of the inverted cone.

2. The brick according to claim 1, wherein the quantity of the slot positions is two and the slot positions are at two ends of the brick body respectively; the slot positions being extended vertically.

3. The brick according to claim 1, wherein a hollow column and/or a hollow wall penetrating the upper and lower surfaces of the brick body is disposed in the middle of the brick body.

4. The brick according to claim 3, wherein the upper edge of a side wall of the hollow wall is lower than the upper edge of the brick body; and/or the lower edge of a side wall of the hollow wall is higher than the lower edge of the brick body.

5. The brick according to claim 1, wherein a waterproof adhesive layer is disposed on the top surface of the brick body and matches the top surface of the brick body in shape.

6. The brick according to claim 1, wherein tongue-and-groove positions for interference-fitting with other bricks are disposed on the top surface of the brick body.

7. The brick according to claim 1, wherein a number of pit slots are disposed on the bottom surface of the brick body and the pit slots contain adhesive rubber blocks.

* * * * *